US012605830B2

(12) United States Patent
Niemueller

(10) Patent No.: US 12,605,830 B2
(45) Date of Patent: Apr. 21, 2026

(54) ROBOT PLANNING FOR GAPS

(71) Applicant: Intrinsic Innovation LLC, Mountain View, CA (US)

(72) Inventor: Tim Niemueller, Gauting (DE)

(73) Assignee: Intrinsic Innovation LLC, Mountain View, CA (US)

( * ) Notice: Subject to any disclaimer, the term of this patent is extended or adjusted under 35 U.S.C. 154(b) by 108 days.

(21) Appl. No.: 18/390,358

(22) Filed: Dec. 20, 2023

(65) Prior Publication Data

US 2024/0217099 A1 Jul. 4, 2024

Related U.S. Application Data

(60) Provisional application No. 63/436,438, filed on Dec. 30, 2022.

(51) Int. Cl.
*B25J 9/16* (2006.01)
(52) U.S. Cl.
CPC ........... B25J 9/1661 (2013.01); B25J 9/1671 (2013.01)
(58) Field of Classification Search
CPC .............................. B25J 9/1661; B25J 9/1671
See application file for complete search history.

(56) References Cited

U.S. PATENT DOCUMENTS

| | | | | |
|---|---|---|---|---|
| 11,747,787 | B2 * | 9/2023 | Dupuis | B25J 9/1664 |
| | | | | 700/245 |
| 11,787,048 | B2 * | 10/2023 | Butterfoss | B25J 9/1661 |
| | | | | 700/255 |
| 2011/0288667 | A1 * | 11/2011 | Noda | G05B 19/42 |
| | | | | 700/98 |
| 2014/0371905 | A1 * | 12/2014 | Eberst | G05B 19/4182 |
| | | | | 700/253 |

(Continued)

FOREIGN PATENT DOCUMENTS

| | | | | | |
|---|---|---|---|---|---|
| CN | 112192577 | A | * | 1/2021 | ........... B25J 9/1661 |
| KR | 20210073001 | A | * | 6/2021 | ........... B25J 9/1697 |
| KR | 20240003844 | A | * | 1/2024 | ........... B25J 9/1682 |

OTHER PUBLICATIONS

KR-20210073001-A translation (Year: 2021).*

(Continued)

*Primary Examiner* — Kyle T Johnson
(74) *Attorney, Agent, or Firm* — Fish & Richardson P.C.

(57) ABSTRACT

Methods, systems, and apparatus, including computer programs encoded on computer storage media, for robot planning. One of the methods includes maintaining a library of pre-generated candidate actions that represent respective robot capabilities; receiving an initial task plan for performing a particular task, wherein the initial task plan includes a sequence of two or more actions that comprises a first action followed by a second action; processing the initial task plan to determine that the first effect of the first action does not result in satisfaction of the second precondition of the (Continued)

100

Workcell 172

Robot A 170a

Sensor A 171a

Robot N 170n

Sensor N 171n

Robotic Control System 160

Modified Task Plan 152

Initial Task Plan 102

Planning System 120

Library of Candidate Actions 130

Candidate Action Selection Engine 140

Task Plan Modification Engine 150 second action; selecting one or more selected pre-generated candidate actions from the library of pre-generated candidate actions; and modifying the initial task plan to include the one or more selected pre-generated candidate actions as the intermediate actions to generate a final task plan to be executed by the one or more particular robots when performing the particular task.

20 Claims, 3 Drawing Sheets

(56) References Cited

U.S. PATENT DOCUMENTS

| | | | | |
|---|---|---|---|---|
| 2017/0146994 | A9 * | 5/2017 | Ammar | G05D 1/0027 |
| 2018/0192845 | A1 * | 7/2018 | Gu | G05D 1/0257 |
| 2018/0344114 | A1 * | 12/2018 | Scholten | G05D 1/03 |
| 2019/0099887 | A1 * | 4/2019 | Huang | G01B 21/042 |
| 2019/0138395 | A1 * | 5/2019 | Purushothaman | G06F 11/1438 |
| 2019/0197396 | A1 * | 6/2019 | Rajkumar | B25J 9/0003 |
| 2019/0391597 | A1 * | 12/2019 | Dupuis | B25J 9/0084 |
| 2021/0049037 | A1 * | 2/2021 | Kattepur | B25J 9/1664 |
| 2021/0197368 | A1 * | 7/2021 | Gaschler | B25J 9/1679 |
| 2021/0362333 | A1 * | 11/2021 | Kolluri | B25J 9/163 |
| 2022/0152816 | A1 * | 5/2022 | Bordignon | B25J 9/1671 |
| 2022/0197306 | A1 * | 6/2022 | Cella | H04L 63/1441 |
| 2022/0226997 | A1 * | 7/2022 | Takahashi | B25J 9/1661 |
| 2023/0110897 | A1 * | 4/2023 | Kansky | B25J 9/1664 700/253 |
| 2023/0241772 | A1 * | 8/2023 | Schillinger | B25J 13/08 700/250 |
| 2023/0390926 | A1 * | 12/2023 | Gaydarov | B25J 9/1664 |
| 2024/0189997 | A1 * | 6/2024 | Lu | B25J 9/1664 |
| 2024/0208059 | A1 * | 6/2024 | Gaschler | B25J 9/1661 |
| 2024/0217099 | A1 * | 7/2024 | Niemueller | B25J 9/1671 |
| 2024/0316761 | A1 * | 9/2024 | Rose | B25J 9/1658 |

OTHER PUBLICATIONS

KR-20240003844-A translation (Year: 2024).*

CN_112192577_A_I_translation (Year: 2021).*

Jackson-et-al-2004-a-new-model-of-scheduling-in-manufacturing-tasks-roles-and-monitoring (Year: 2004).*

Ten_iterative_steps_in_development_and_evaluation_of_environmental_models2006 (Year: 2006).*

Hoffmann et al., "Macro Operator Synthesis for ADL Domains," ECAI, IOS Press, 2020, pp. 761-768.

* cited by examiner

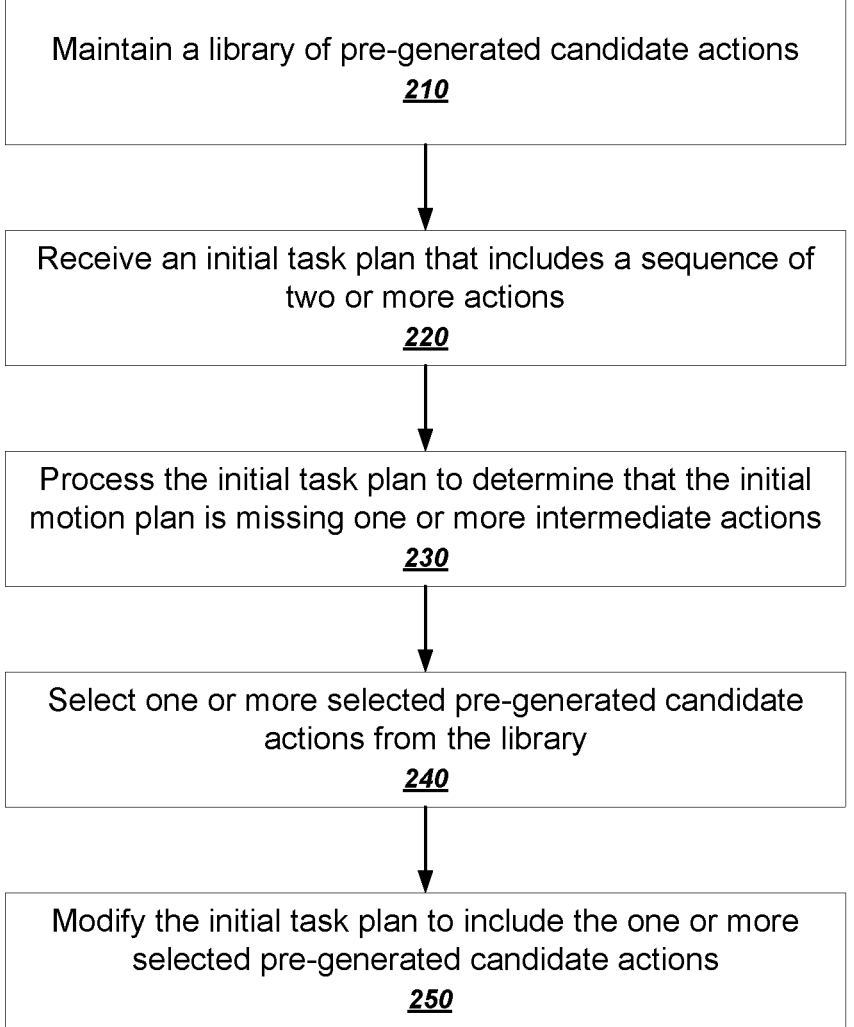

Maintain a library of pre-generated candidate actions
210

Receive an initial task plan that includes a sequence of two or more actions
220

Process the initial task plan to determine that the initial motion plan is missing one or more intermediate actions
230

Select one or more selected pre-generated candidate actions from the library
240

Modify the initial task plan to include the one or more selected pre-generated candidate actions
250

FIG. 2

ROBOT PLANNING FOR GAPS

CROSS-REFERENCE TO RELATED APPLICATIONS

This application claims priority to U.S. Provisional Application No. 63/436,438, filed on Dec. 30, 2022. The disclosure of the prior application is considered part of and is incorporated by reference in the disclosure of this application.

BACKGROUND

This specification relates to robotics, and more particularly to robot task planning.

Robotics planning refers to scheduling the actions by robots, such as physical movements of the robots, in order to perform tasks. For example, an industrial robot that builds cars can be programmed to first pick up a car part and then weld the car part onto the frame of the car. Each of these actions can themselves include dozens or hundreds of individual movements by robot motors and actuators.

Robotics planning has traditionally required immense amounts of manual programming in order to meticulously dictate how the robotic components should move in order to accomplish a particular task. Manual programming is tedious, time-consuming, and error prone. In addition, a robot task plan that is manually generated for one workcell can generally not be used for other workcells. In this specification, a workcell is the physical environment in which one or more robots will operate. Workcells have particular physical properties, e.g., physical dimensions that impose constraints on how robots can move within the workcell. Thus, a manually programmed robot task plan for one workcell may be incompatible with a workcell having different robots, a different number of robots, or different physical dimensions.

Some robotics planning algorithms operate from an end goal and seek to generate all the steps of a robot task plan required to achieve the end goal. This approach is oftentimes inefficient due to the need to search through a search space which can be extremely large and to rediscover many intermediate states that are already known at planning time.

SUMMARY

This specification describes how a system can generate a task plan for one or more robots. In particular, the system receives an initial task plan for performing a particular task with the one or more robots. The initial task plan can include a sequence of two or more actions. The sequence of the two or more actions can include a first action immediately followed by a second action. In various cases, a gap might exist between the first action and second action in the sequence of two or more actions. As used throughout this specification, a "gap" refers to a discontinuity or mismatch between (i) a state that a workcell has transitioned into as a result of the performance of the first action, and (ii) the state that the workcell should have transitioned into prior to the performance of the second action which immediately follows the first action in the sequence.

In particular, each action has a corresponding effect that can be achieved following execution of the action, and a corresponding precondition that must be satisfied prior to execution of the action. The system processes the initial task plan to determine that the corresponding effect of the first action in the initial task plan will not result in satisfaction of the corresponding precondition of the second action, which follows the first action in the sequence of two or more actions. In response to determining that the precondition of the second action will not be satisfied, namely that there exists a gap between the first and second actions, the system selects one or more pre-generated candidate actions from a library of pre-generated candidate actions and then modifies the initial task plan to include the one or more selected actions as intermediate actions between the first and second actions.

Particular embodiments of the subject matter described in this specification can be implemented so as to realize one or more of the following advantages. Using the robotics planning techniques described in this specification can dramatically reduce the amount of manual programming, the consumption of computational resources (e.g., processor cycles, memory, power consumption, and so on), or both required to program robots. Rather than beginning with a given description of the initial and the goal situations of a particular task, the system can rapidly generate a final task plan for one or more robots to accomplish the particular task from a partial solution, i.e., an initial task plan, that is currently available, by using actions selected from a library of pre-generated candidate actions as gap filing actions in order to fully specify the final task plan.

While the initial task plan may include an incomplete sequence of actions probably provided by a third-party developer different from both the manufacturer and the operator of the robots, the final task plans are likely to be more customized for the robots actually used to perform the particular task, and hence faster and more efficient, than manually programmed task plans. Moreover, by combining heuristics from different sources, including user specification of mid-level actions for achieving an intended goal as well as previously learned information about common gap filling patterns, the amount of computational resources required for selecting such actions from the library can be reduced because iteratively and exhaustively searching through the entire library to discover all actions that are needed to accomplish the particular task is no longer required. Instead, only a relatively small number of actions need to be selected and evaluated during the generation of the final task plan.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2 is a flowchart of an example process for generating a final task plan from an initial task plan.

Like reference numbers and designations in the various drawings indicate like elements.

DETAILED DESCRIPTION

Figure 1:
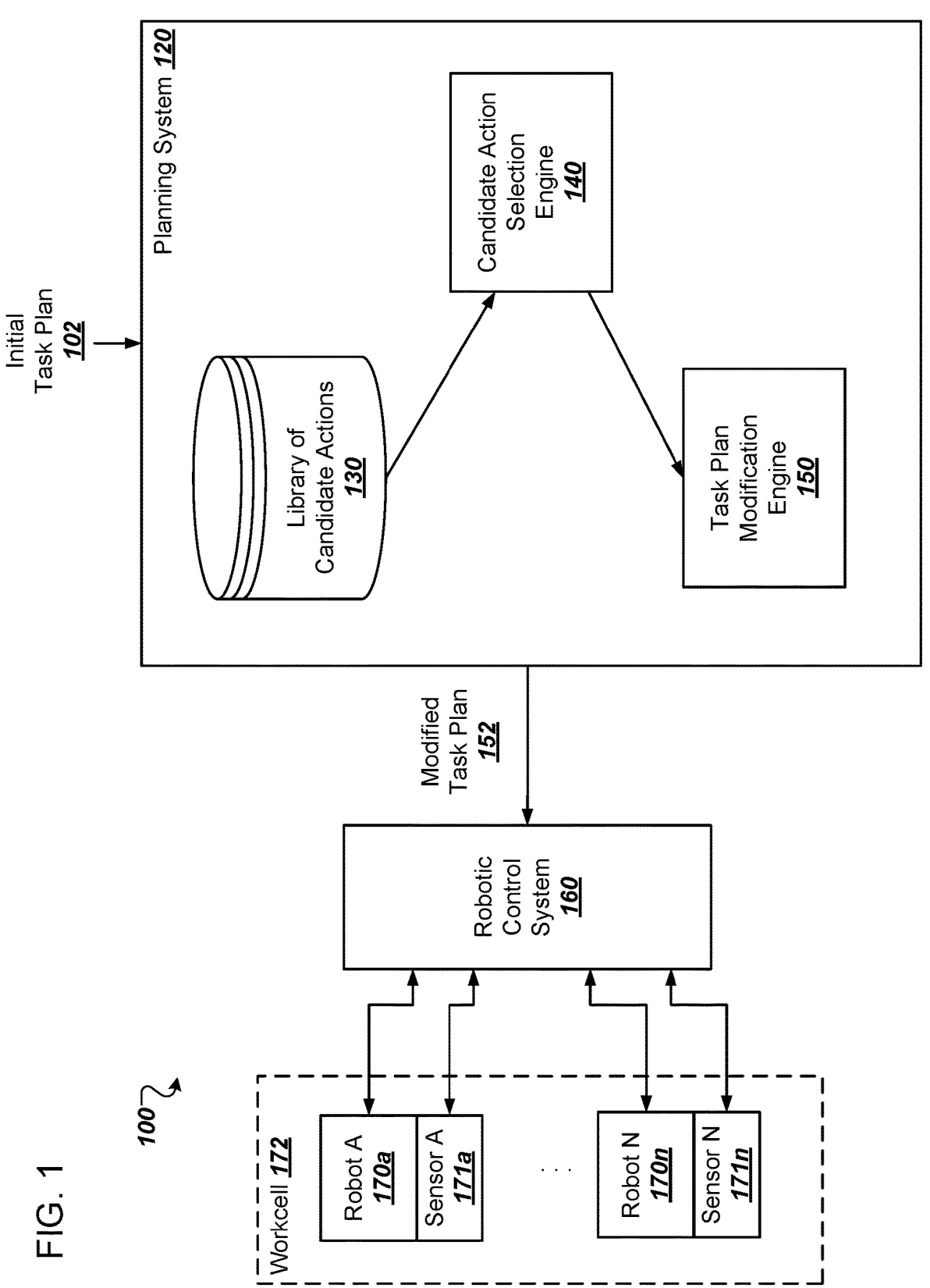
FIG. 1 is a diagram that illustrates an example system.

FIG. 1 is a diagram that illustrates an example system 100. The system 100 is an example of a system that can implement the robotics planning techniques described in this specification.

The system 100 includes a number of functional components, including a planning system 120 and a robotic control system 160. Each of these components can be implemented as computer programs installed on one or more computers in one or more locations that are coupled to each other through any appropriate communications network, e.g., an intranet or the Internet, or combination of networks. The system 100 also includes a workcell 172 that includes one or more robots, e.g., robots 170*a-n*, and one or more sensors, e.g., sensors 171*a-n*. The sensors can be any device that can make observations within the workcell 172, e.g., a camera, a lidar sensor, a force sensor, a pressure sensor, or an ultrasonic sensor. As illustrated in FIG. 1, each sensor 171 is coupled to a respective robot 170. However, the sensors need not have a one-to-one correspondence with robots and need not be coupled to the robots. In fact, each robot can have multiple sensors, and the sensors can be mounted on stationary or movable surfaces in the workcell 172.

The overall goal of the planning system 120 is to generate, for a particular task to be performed by the one or more robots 170*a-n* in the workcell 172, a task plan that will be executed by the robots in order to accomplish the particular task. The planning system 120 stores a plurality of pre-generated candidate actions in a library of candidate actions 130. The pre-generated candidate actions maintained in the library can be defined by any entity, e.g., by a robot manufacturer, by a tool manufacturer, and/or by a user of the planning system. Each of the pre-generated candidate action can represent an individual capability of a robot, either with or without a tool. For example, an action can be to move a robot arm, apply a weld, dispense an adhesive, open a gripper, close a gripper, or any other appropriate action that can be performed by the robot. The action can also be a composite action that includes multiple actions. For example, a composite action to grasp an object can include an action to move a robot arm followed by another action to close a gripper.

In this specification, a robot is a machine having a base position, one or more movable components, and a kinematic model that can be used to map desired positions, poses, or both in one coordinate system, e.g., Cartesian coordinates, into commands for physically moving the one or more movable components to the desired positions or poses. In this specification, a tool (or end effector) is a device that is part of and is attached at the end of the kinematic chain of the one or more moveable components of the robot. Example tools include grippers, welding devices, and sanding devices. That is, a robot can include one or more tools.

In this specification, a task is an operation to be performed by a tool. For brevity, when a robot has only one tool, a task can be described as an operation to be performed by the robot as a whole. Example tasks include welding, glue dispensing, part positioning, and surfacing sanding, to name just a few examples. Tasks are generally associated with a type that indicates the tool required to perform the task, as well as a position within a workcell at which the task will be performed.

In this specification, a task plan is a data structure that provides information for executing a task. A task plan can include multiple actions. Some example actions can include non-robot operations, e.g., obtaining sensor data, performing a calculation using the obtained sensor data, and so on. Some other example actions can include robot motions. These other example actions can be primitive robot motions, e.g., moving a robot arm, opening/closing a gripper, or more composite robot motions, e.g., picking up an object using the robot, which in turn includes multiple primitive robot motions. In some implementations, a task plan can be represented as a task graph where each node in the task graph represents a respective action and edges connecting the nodes represent an order (e.g., a sequential or concurrent order) of the actions. Generally, there is one task graph per robot.

Task plans can be fully parameterized, meaning that all values for all controllable degrees of freedom for the robot are represented explicitly or implicitly; or underparameterized, meaning that some values for controllable degrees of freedom are unspecified. In some implementations, in order to actually perform an action corresponding to a task plan, the task plan must be fully parameterized to include all necessary values for all controllable degrees of freedom for the robot. Thus, at some points in the planning processes described in this specification, some task plans may be underparameterized, but by the time the task plan is actually executed on a robot, the task plan can be fully parameterized.

The planning system 120 receives an initial task plan 102 for the particular task. The initial task plan 102 may be generated by a different entity than the one or more entities that generated the library of pre-generated candidate actions 130 and uploaded to the planning system 120. The initial task plan 102 may be (at least partially) agnostic to different robot models, i.e., may include at least one common action that can be performed by various robot models. For example, a third-party developer can develop a task plan for using an in-home consumer robot to assemble a consumer product, e.g., a bookshelf or a desk, in a workcell that is new and/or temporary, e.g., in a garage. As another example, a robot task planner can develop a task plan that specifies a manufacturing process of an object, where an industrial robot moves the object among different stations of a workcell to apply different types of processing on the object. For example, the processing can be an assembly, packing, welding, or gluing processing.

The initial task plan 102 may specify a sequence of actions to be performed by the robots in the workcell 172. Performance of the actions generally cause the workcell 172 to transition into different states. The initial task plan 102 may be a partial, or incomplete, task plan, meaning that there could exist certain gaps between one or more pairs of adjacent actions in the sequence. In this specification, a gap between a pair of adjacent actions refers to a discontinuity or mismatch between (i) a state that the workcell has transitioned into after performing a first action in the pair and (ii) a state that the workcell should have transitioned into before performing a second action in the pair. For example, the discontinuity can be a geometric discontinuity, e.g., a difference in object poses (positions and orientations), a kinematic discontinuity, e.g., a difference in the grasps (tool center positions) or in the robot poses, and the like. The existence of such a gap typically prevents the robot from immediately beginning to perform the second action once the first action is completed.

The planning system 120 uses the initial task plan 102 to generate a modified task plan 152 for the robotic control system 150 that, when executed by the robots in the workcell 172, will accomplish the particular task intended for by the initial task plan 102. To generate the modified task plan 152 to be executed by the robots 170*a-n*, the planning system 120 includes a candidate action selection engine 140 that is configured to obtain one or more pre-generated candidate actions from the library of pre-generated candidate actions 130.

For every pair of action for which a gap exists, the candidate task plan selection module 112 can select the candidate action(s) that best fit in the gap, i.e., selects the candidate action(s) that can result in a smooth and continuous transition from the first action to the second action in the pair. The planning system 120 also includes a task plan modification engine 150 that is configured to modify the initial task plan 102 by adding the selected actions into appropriate locations in the sequence of actions specified by the initial task plan 102 to generate the final task plan 152. The task plan modification engine 150 can insert the selected actions as intermediate actions—or, "gap filing" actions— between a first action and a second action in every pairs of actions for which a gap exists. This process of generating the final task plan is described in more detail below with reference to FIG. 2.

The planning system 120 gives the modified task plan 152 to the robotic control system 160. In some implementations, the planning system 120 is an offline planning system. That is, the planning system 120 can provide the modified task plan 152 to the robotic control system 160 before the robotic control system 160 executes any operations, and the planning system 120 does not receive any direct feedback from the robotic control system 160. In some such implementations, the planning system 120 can be hosted offsite at a data center separate from a facility that houses the workcell 172. On the other hand, the robotic control system 160 is typically local to the facility that houses the workcell 172.

In some other implementations, the planning system 120 can be an online planning system, which can make online adjustments to robot task plans that are currently in execution. That is, the robotic control system 160 can receive the initial 102 or modified task plan 152 and begin execution, and provide feedback on the execution to the planning system 120. The planning system 120 can respond to feedback from the robotic control system 160, and generate a new modified task plan in response to the feedback.

The robotic control system 160 executes the modified task plan 152 by issuing commands to the workcell 172 in order to drive the movements of the robots 170a-n to accomplish the particular task. In particular, the robotic control system 160 can issue commands for each action one by one in order according to the sequence of actions specified by the modified task plan 152.

FIG. 2 is a flowchart of an example process 200 for generating a final task plan from an initial task plan. The process 200 can be implemented by one or more computer programs installed on one or more computers in one or more locations and programmed in accordance with this specification. For example, the process 200 can be performed by the planning system 120 shown in FIG. 1. For convenience, the process 200 will be described as being performed by a system of one or more computers.

The system maintains a library of pre-generated candidate actions that represent respective capabilities of one or more particular robots (210). The library of pre-generated candidate actions can include hardware-agonistic actions that represent capabilities shared by different robot models. The library of pre-generated candidate actions can also include hardware-specific actions that represent particular capabilities of a particular robot model, or particular capabilities with a particular tool, or both.

The system receives an initial task plan for performing a particular task (220). The initial task plan has a sequence of two or more actions with a first action followed by a second action. The first action and the second action are adjacent actions in the sequence, i.e., there is no intervening action between the first action and the second action in the sequence specified by the initial task plan, although there may, and generally will, be additional actions that precede the first action in the sequence, follow the second action in the sequence, or both.

Each action is associated with a precondition and an effect. For each action, the precondition is a condition that must be satisfied prior to execution of the action, and the effect is a result that can be achieved following execution of the action. For example, an assembly action may require as a precondition that a workpiece has a certain orientation, while a welding action may deliver a result that a certain amount of weld has been applied on a workpiece. In some cases, the preconditions and effects can be expressed in logical formulas, for example a precondition for a grasping action can be expressed as "hand_free and robot_at(grasp-_pose)". In some cases, the preconditions and effects of the actions are explicitly defined by the entity which provides the initial task plan, while in other cases, the preconditions and effects can be inferred/determined automatically by the system depending on the types and/or other information of actions in the initial task plan.

Figure 3:
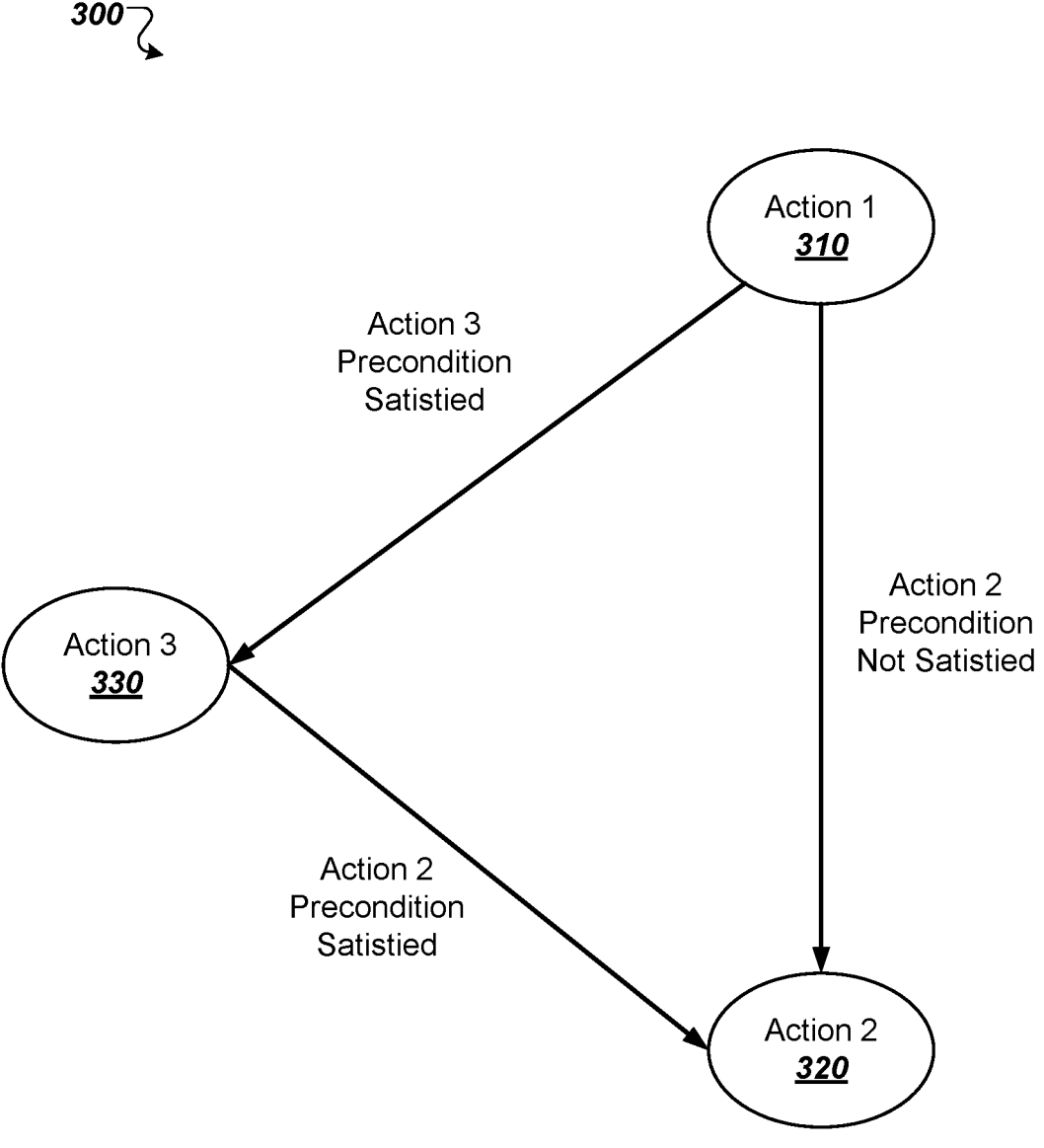
FIG. 3 illustrates an example of modifying an initial task plan to include one or more selected pre-generated candidate actions as intermediate actions.

FIG. 3 illustrates an example of modifying an initial task plan to include one or more selected pre-generated candidate actions as intermediate actions. For example, the initial task plan can be a task plan for an object pick-and-place task which includes a first action of picking up an object from a current location, and a second action of placing the object at a target location.

Thus in FIG. 3, action 310 can be an action instructing a robot to pick up an object, e.g., using a robot arm, from a current location. A precondition of action 310 can be that the robot is in a specific location within a threshold distance to the current location of the object so that the object can be picked up from its current location. An effect of action 310 can be that the object is within the grasp of the robot arm. Action 310 is followed by action 320 which can be an action instructing the robot to put the object down at the target location. A precondition of action 320 can be that the robot is in a specific location within a threshold distance to the target location so that the object can be placed in the target location. An effect of action 320 can be that the object is in the target location.

The system processes the initial task plan to determine there exists a gap between the first and second actions included in the initial task plan (230). In some cases, the gap between the first and second actions is explicitly defined by the entity which provides the initial task plan (for example by including a placeholder action or some other representation indicative of a gap between the first and second actions in the initial task plan), while in other cases, the gap need to be inferred/determined automatically by the system from the actions included in the initial task plan.

In these other cases, the system can iterate through the sequence of actions specified by initial task plan while keeping track of the latest states of the workcell as a result of the performance of each of the actions in the sequence, e.g., the pose of the object, the pose of the robot, and so on, and correspondingly determine whether there exists a discontinuity or mismatch between (i) the state that the workcell has transitioned into as a result of the performance of the action, e.g., the first action, and (ii) the state that the workcell should have transitioned into prior to the performance of the next action in the sequence, e.g., the second action. If so, the system can determine that a gap exists between the first and second actions. That is, the system can determine that the first effect of the first action does not result in satisfaction of the second precondition of the second action, and that the initial task plan is missing one or more intermediate actions between the first action and the second action that are required for performing the particular task with the one or more particular robots. To further improve the efficiency of the iteration process, some implementations of the system can compute a combined precondition and/or effect of two or more actions in the initial task plan by using the macro operator generation techniques described in https://ebooks.iospress.nl/doi/10.3233/FAIA200164.

In the example of FIG. 3, after performing action 310 to pick up the object, the robot is still within a threshold distance to the current location of the object, and thus is far away from the target location in which the object should be placed. Accordingly, the system can determine that the precondition of the action 320, which requires the robot to be within a threshold distance to target location, is not satisfied by performing action 310 alone.

In some cases, the system provides the initial task plan to the robotic control system for execution. When the robotic control system executes the initial plan including performing the first action in the sequence, the system can receive online observation data and/or status messages and based on that data determine that the first effect on the workcell that has been achieved following performance of the first action does not result in satisfaction of the second precondition of the second action, e.g., prior to performance of the second action in the sequence. For example, the online observation data can include pose readings from a robot controller that indicates a current position of the robot, and the system can use the pose readings to determine whether the robot being in this current position satisfies the precondition that the robot should be less than a threshold distance away from a target location, as required by the second action. As another example, the online observation data can include sensor data from sensors, e.g., a pressure value from a pressure sensor, and the system can use the sensor data to determine that an object is within the grasp of the robot, as required as precondition by the second action.

In other cases, the determination that a gap exists between the first and second actions can be made in a computer simulation of a real-world workcell within which one or more simulated robots are executing the initial task plan. Processing the initial task plan in simulation may assist in development of the task plan, in testing the realism of certain effects that can be achieved through execution of the actions, and in ensuring that the simulation includes surprising faults or other unanticipated conditions that are likely to be encountered in the real-world. More generally, processing the initial task plan in simulation can be part of validation of the initial task plan before the initial task plan is deployed for execution by the robots, or testing of the one or more robots that will be used to execute the initial task plan, or both.

The system selects one or more selected pre-generated candidate actions from the library of pre-generated candidate actions (240). This selection can be based on the first effect of the first action, the second precondition of the second action, or both. For example, in response to determining that the first effect of the first action cannot result in satisfaction of the second precondition of the second action, the system selects from the library a third action that has a third precondition which can be satisfied by the first effect of the first action and a third effect which can result in satisfaction of the second precondition of the second action.

In the example of FIG. 3, in response to determining that the precondition of the action 320 is not satisfied, an action 330 of moving the robot with the object within the grasp of the robot arm can be selected by the system from the library. The action 330 can have a precondition that the object is within the grasp of the robot arm, which can be achieved by performing the action 310. The action 330 can have an effect that the robot is in a specific location within a threshold distance to the target location, which in turn satisfies the precondition of action 320. Thus when execution of the action 330 is completed, the system can proceed to execute the action 320 in the sequence. Although FIG. 3 shows just one pre-generated candidate action being selected, in other scenarios more actions may be selected one after another in a similar way, depending on how the actions are specified in the initial task plan, how the candidate actions are pre-generated in the library, or both.

Robots naturally have a very complex, high-dimensional, and continuous action space. Thus, it is computationally and temporally intractable to evaluate all possible candidate actions in the library to determine the best action selection. To alleviate this issue, some implementations of the system can determine which actions to select from the library with guidance from user-specified heuristics. Such heuristics can direct the candidate action selection process to favor actions identified explicitly or implicitly by a user, actions available specifically for the particular task/robot/tool, and so on over remaining actions in the library. In some such implementations, the system can present a graphical user interface that lists possible candidate actions in the library and can receive a user selection through the graphical user interface of the candidate actions to be added to the sequence of actions. The system can also receive through the interface a user specification of the intended goals of the actions, known requirements of the actions, and so on.

Additionally or alternatively, some implementations of the system can determine which actions to select from the library by using one or more data models that relate different effects and preconditions to the pre-generated candidate actions. For example, a library query for a given effect (or precondition) would return all pre-generated candidate actions associated with the given effect (or precondition), and the use of a data model assists in more efficient response to the library query. In some such implementations, the system can include multiple data models. For example, one data model can be a logical data model, and another can be a physical data model. The logical or physical data model can organize the pre-generated candidate actions stored in the library in accordance with the effects and preconditions associated with the actions, or other mapping rules defined by the user.

The system modifies the initial task plan to include the one or more selected pre-generated candidate actions as the intermediate actions to generate a final task plan to be executed by the one or more particular robots when performing the particular task (250). In general the system can insert the one or more selected pre-generated candidate actions as gap filing actions between the first and second actions in the sequence of actions specified by the initial task plan.

In the example of FIG. 3, the system modifies the initial task plan to include the selected action 330 as the intermediate action between action 310 and action 320. The final task plan generated from the initial task plan includes an action 310 of picking up an object using a robot arm, followed by an action 330 of moving the robot arm with the object within the grasp of the robot arm, followed by an action 320 of placing the object at a target location. Although the final task plan in FIG. 3 is shown with three actions, as described above there may be more actions specified by the initial task plan, and the system can iteratively perform process 200 for each of one or more pairs of adjacent actions in a sequence to generate a final task plan that includes more actions.

In some cases, the modification is a local modification that does not require reconsideration of all actions in the sequence and which affects only a sufficiently small number of actions in the sequence. For example, a local modification can include the insertion of a single action between the first and second actions in the sequence of actions specified by the initial task plan.

In other cases, the modification is a global modification that involves reconsideration of a larger number of actions in the sequence. An example of such a global modification is the use of backtracking algorithms to modify one or more preceding actions that precede the first action in the sequence based on the one more selected pre-generated candidate actions. For example, a backtracking algorithm may rearrange the ordering of the preceding actions in the sequence, add additional actions to the sequence, remove existing actions from the sequence, and so on to ensure efficiency or to avoid conflicts.

More specifically, in the cases of multiple gaps existing in the initial task plan, the system may introduce new conflicts as a result of the selected gap filing actions (here a conflict would mean that the actions selected for the first gap would make it impossible to selected any action of the second gap). Then the system needs to reiterate and search for solutions to both gaps such that they are conflict-free. For example, consider a robot with two arms holding a hammer and a task of hammering a nail currently lying on the ground into the wall, if for a first gap that exists before the action of picking up the nail would result in selection of an action to drop the hammer to free the hand to pick up the nail, then no action could be selected for a second gap that exists before positioning the picked up nail against the wall. In this example the system needs to reiterate and, e.g., decide to pick up the nail with one robot arm while the other robot arm still holds onto the hammer.

The robot functionalities described in this specification can be implemented by a hardware-agnostic software stack, or, for brevity just a software stack, that is at least partially hardware-agnostic. In other words, the software stack can accept as input commands generated by the planning processes described above without requiring the commands to relate specifically to a particular model of robot or to a particular robotic component. For example, the software stack can be implemented at least partially by the planning system 120 and the robotic control system 160 of FIG. 1.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively, or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g, a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A method performed by one or more computers, the method comprising:

maintaining a library of pre-generated candidate actions that represent respective capabilities of one or more particular robots;

receiving an initial task plan for performing a particular task, wherein the initial task plan includes a sequence of two or more actions that comprises a first action followed by a second action, and wherein the first action has a first effect that can be achieved following execution of the first action and the second action has a second precondition that must be satisfied prior to execution of the second action;

processing the initial task plan to determine that the first effect of the first action does not result in satisfaction of the second precondition of the second action, and that the initial task plan is missing one or more intermediate actions between the first action and the second action that are required for performing the particular task with the one or more particular robots, wherein processing the initial task plan comprises iterating through the sequence of two or more actions specified by the initial task plan and keeping track of a latest state of a workcell that includes the one or more particular robots, the latest state of the workcell reflecting the first effect of the first action;

selecting, based on the first effect of the first action and the second precondition of the second action, one or more selected pre-generated candidate actions from the library of pre-generated candidate actions;

modifying the initial task plan to include the one or more selected pre-generated candidate actions as the intermediate actions to generate a final task plan to be executed by the one or more particular robots when performing the particular task; and controlling the one or more particular robots to perform the particular task based on the final task plan.

2. The method of claim 1, wherein the library of pre-generated candidate actions comprises hardware-agonistic actions that represent capabilities shared by different robot models, hardware-specific actions that represent particular capabilities of a particular robot model or particular capabilities with a particular tool, or both.

3. The method of claim 1, wherein the one or more intermediate actions comprise a third action that has a third precondition which can be satisfied by the first effect of the first action and a third effect which can result in satisfaction of the second precondition of the second action.

4. The method of claim 1, wherein selecting the one or more selected pre-generated candidate actions from the library of pre-generated candidate actions comprises selecting the one or more selected pre-generated candidate actions using a logical model that relates different effects and preconditions to the pre-generated candidate actions.

5. The method of claim 1, wherein modifying the initial task plan to include the one more selected pre-generated candidate actions as the intermediate actions comprises using backtracking algorithms to modify one or more preceding actions in the sequence of two or more actions based on the one more selected pre-generated candidate actions.

6. The method of claim 1, wherein the initial task plan is provided by a different entity than an entity that generated the library of pre-generated candidate actions.

7. The method of claim 1, wherein the initial task plan is agonistic to different robot models.

8. A system comprising one or more computers and one or more storage devices storing instructions that are operable, when executed by the one or more computers, to cause the one or more computers to perform operations comprising:

maintaining a library of pre-generated candidate actions that represent respective capabilities of one or more particular robots;

receiving an initial task plan for performing a particular task, wherein the initial task plan includes a sequence of two or more actions that comprises a first action followed by a second action, and wherein the first action has a first effect that can be achieved following execution of the first action and the second action has a second precondition that must be satisfied prior to execution of the second action;

processing the initial task plan to determine that the first effect of the first action does not result in satisfaction of the second precondition of the second action, and that the initial task plan is missing one or more intermediate actions between the first action and the second action that are required for performing the particular task with the one or more particular robots, wherein processing the initial task plan comprises iterating through the sequence of two or more actions specified by the initial task plan and keeping track of a latest state of a workcell that includes the one or more particular robots, the latest state of the workcell reflecting the first effect of the first action;

selecting, based on the first effect of the first action and the second precondition of the second action, one or more selected pre-generated candidate actions from the library of pre-generated candidate actions;

modifying the initial task plan to include the one or more selected pre-generated candidate actions as the intermediate actions to generate a final task plan to be executed by the one or more particular robots when performing the particular task; and controlling the one or more particular robots to perform the particular task based on the final task plan.

9. The system of claim 8, wherein the library of pre-generated candidate actions comprises hardware-agonistic actions that represent capabilities shared by different robot models, hardware-specific actions that represent particular capabilities of a particular robot model or particular capabilities with a particular tool, or both.

10. The system of claim 8, wherein the one or more intermediate actions comprise a third action that has a third precondition which can be satisfied by the first effect of the first action and a third effect which can result in satisfaction of the second precondition of the second action.

11. The system of claim 8, wherein selecting the one or more selected pre-generated candidate actions from the library of pre-generated candidate actions comprises selecting the one or more selected pre-generated candidate actions using a logical model that relates different effects and preconditions to the pre-generated candidate actions.

12. The system of claim 8, wherein modifying the initial task plan to include the one more selected pre-generated candidate actions as the intermediate actions comprises using backtracking algorithms to modify one or more preceding actions in the sequence of two or more actions based on the one more selected pre-generated candidate actions.

13. The system of claim 8, wherein the initial task plan is provided by a different entity than an entity that generated the library of pre-generated candidate actions.

14. The system of claim 8, wherein the initial task plan is agonistic to different robot models.

15. A computer storage medium encoded with a computer program, the program comprising instructions that are operable, when executed by data processing apparatus, to cause the data processing apparatus to perform operations comprising:

maintaining a library of pre-generated candidate actions that represent respective capabilities of one or more particular robots;

receiving an initial task plan for performing a particular task, wherein the initial task plan includes a sequence of two or more actions that comprises a first action followed by a second action, and wherein the first action has a first effect that can be achieved following execution of the first action and the second action has a second precondition that must be satisfied prior to execution of the second action; processing the initial task plan to determine that the first effect of the first action does not result in satisfaction of the second precondition of the second action, and that the initial task plan is missing one or more intermediate actions between the first action and the second action that are required for performing the particular task with the one or more particular robots, wherein processing the initial task plan comprises iterating through the sequence of two or more actions specified by the initial task plan and keeping track of a latest state of a workcell that includes the one or more particular robots, the latest state of the workcell reflecting the first effect of the first action;

selecting, based on the first effect of the first action and the second precondition of the second action, one or more selected pre-generated candidate actions from the library of pre-generated candidate actions;

modifying the initial task plan to include the one or more selected pre-generated candidate actions as the intermediate actions to generate a final task plan to be executed by the one or more particular robots when performing the particular task; and controlling the one or more particular robots to perform the particular task based on the final task plan.

16. The computer storage medium of claim 15, wherein the library of pre-generated candidate actions comprises hardware-agonistic actions that represent capabilities shared by different robot models, hardware-specific actions that represent particular capabilities of a particular robot model or particular capabilities with a particular tool, or both.

17. The computer storage medium of claim 15, wherein the one or more intermediate actions comprise a third action that has a third precondition which can be satisfied by the first effect of the first action and a third effect which can result in satisfaction of the second precondition of the second action.

18. The computer storage medium of claim 15, wherein selecting the one or more selected pre-generated candidate actions from the library of pre-generated candidate actions comprises selecting the one or more selected pre-generated candidate actions using a logical model that relates different effects and preconditions to the pre-generated candidate actions.

19. The computer storage medium of claim 15, wherein modifying the initial task plan to include the one more selected pre-generated candidate actions as the intermediate actions comprises using backtracking algorithms to modify one or more preceding actions in the sequence of two or more actions based on the one more selected pre-generated candidate actions.

20. The computer storage medium of claim 15, wherein the initial task plan is provided by a different entity than an entity that generated the library of pre-generated candidate actions.

\* \* \* \* \*